United States Patent
Nakamura

(10) Patent No.: US 11,539,912 B2
(45) Date of Patent: Dec. 27, 2022

(54) METHOD FOR CONTROLLING DISPLAY APPARATUS, DISPLAY APPARATUS, AND METHOD FOR CONTROLLING DISPLAY SYSTEM

(71) Applicant: SEIKO EPSON CORPORATION, Tokyo (JP)

(72) Inventor: Yasuhiro Nakamura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 82 days.

(21) Appl. No.: 17/183,910

(22) Filed: Feb. 24, 2021

(65) Prior Publication Data

US 2021/0266492 A1 Aug. 26, 2021

(30) Foreign Application Priority Data

Feb. 25, 2020 (JP) .............................. JP2020-029120

(51) Int. Cl.
| | |
|---|---|
| *H04N 5/63* | (2006.01) |
| *G06F 3/14* | (2006.01) |
| *H04N 9/31* | (2006.01) |
| *G09G 3/00* | (2006.01) |
| *H04N 1/00* | (2006.01) |

(52) U.S. Cl.
CPC ................ *H04N 5/63* (2013.01); *G06F 3/14* (2013.01); *G09G 3/002* (2013.01); *H04N 9/31* (2013.01); *G09G 2330/021* (2013.01); *G09G 2330/022* (2013.01); *H04N 1/00896* (2013.01)

(58) Field of Classification Search
CPC ........ H04N 5/63; H04N 9/31; H04N 1/00896; G06F 3/14; G09G 3/002; G09G 2330/021; G09G 2330/022

USPC .......................................................... 345/212
See application file for complete search history.

(56) References Cited

U.S. PATENT DOCUMENTS

| | | | |
|---|---|---|---|
| 6,184,875 B1* | 2/2001 | Matsuura ............... | G06F 1/3203 345/102 |
| 2008/0284855 A1* | 11/2008 | Umeyama .............. | H04N 5/772 348/E5.042 |
| 2011/0063207 A1* | 3/2011 | Lee .......................... | G09G 5/10 345/156 |

(Continued)

FOREIGN PATENT DOCUMENTS

| | | |
|---|---|---|
| JP | 2004-021218 A | 1/2004 |
| JP | 2005-292707 A | 10/2005 |
| JP | 2008-278107 A | 11/2008 |

(Continued)

*Primary Examiner* — Tom V Sheng
(74) *Attorney, Agent, or Firm* — Oliff PLC

(57) ABSTRACT

A method for controlling a display apparatus that displays an image based on an image signal supplied from an image supply apparatus that transitions to a first sleep mode in accordance with a situation in which a no-operation state lasts for a first period, the method including storing second information representing a second period, causing the display apparatus to transition to a second sleep mode in accordance with a situation in which the image signal is not supplied continuously for the second period, receiving first information representing the first period from the image supply apparatus, and setting the second information in such a way that the second period is shorter than a reference period in accordance with the first information.

7 Claims, 6 Drawing Sheets

(56) References Cited

U.S. PATENT DOCUMENTS

2014/0160517 A1 6/2014 Masuyama
2017/0308350 A1* 10/2017 Shigemitsu ........... G06F 3/1462

FOREIGN PATENT DOCUMENTS

| JP | 2012-141486 A | 7/2012 |
| JP | 2014-115771 A | 6/2014 |

* cited by examiner

FIG. 6

| t1 (MINUTE) | — | 15 | 5 | 1 |
|---|---|---|---|---|
| t2 (MINUTE) | 20 | 15 | 5 | 1 |

FIG. 7

| t1 (MINUTE) | — | 5 | 15 | LONGER THAN OR EQUAL TO 20 |
|---|---|---|---|---|
| t2 (MINUTE) | 20 | 15 | 5 | 0 |

METHOD FOR CONTROLLING DISPLAY APPARATUS, DISPLAY APPARATUS, AND METHOD FOR CONTROLLING DISPLAY SYSTEM

The present application is based on, and claims priority from JP Application Serial Number 2020-029120, filed Feb. 25, 2020, the disclosure of which is hereby incorporated by reference herein in its entirety.

BACKGROUND

1. Technical Field

The present disclosure relates to a method for controlling a display apparatus, a display apparatus, and a method for controlling a display system.

2. Related Art

JP-A-2012-141486 discloses a projector that transitions to a sleep mode in which the light source is turned off when input of an image signal is not detected for a predetermined period.

There is a known function called an automatic sleep function of achieving transition to a low-power-consumption sleep mode when a no-operation state lasts for a predetermined standby period. To acquire an image signal from an image supply apparatus having the automatic sleep function, the projector disclosed in JP-A-2012-141486 uniformly requires a period that is the sum of the standby period of the image supply apparatus and the standby period of a display apparatus before automatic transition to the sleep mode. The power consumption before the transition to the sleep mode therefore increases in some cases.

SUMMARY

An aspect relates to a method for controlling a display apparatus that displays an image based on an image signal supplied from an image supply apparatus that transitions to a first sleep mode in accordance with a situation in which a no-operation state lasts for a first period, the method including storing second information representing a second period, causing the display apparatus to transition to a second sleep mode in accordance with a situation in which the image signal is not supplied continuously for the second period, receiving first information representing the first period from the image supply apparatus, and setting the second information in such a way that the second period is shorter than a reference period in accordance with the first information.

Another aspect relates to a display apparatus that displays an image based on an image signal supplied from an image supply apparatus that transitions to a first sleep mode in accordance with a situation in which a no-operation state lasts for a first period, the apparatus including a storage circuit that stores second information representing a second period, an interface that receives first information representing the first period from the image supply apparatus, and a processing circuit that transitions to a second sleep mode in accordance with a situation in which the image signal is not supplied continuously for the second period and sets the second information in such a way that the second period is shorter than a reference period in accordance with the first information.

Another aspect relates to a method for controlling a display system including an image supply apparatus that supplies an image signal and a display apparatus that displays an image based on the image signal, the method including causing the image supply apparatus to transition to a first sleep mode in accordance with a situation in which a no-operation state lasts for a first period, causing the display apparatus to store second information representing a second period, causing the display apparatus to transition to a second sleep mode in accordance with a situation in which the image signal is not supplied continuously for the second period, causing the image supply apparatus to transmit first information representing the first period to the display apparatus, and causing the display apparatus to set the second information in such a way that the second period is shorter than a reference period in accordance with the first information.

BRIEF DESCRIPTION OF THE DRAWINGS

FIG. 6 is a table for describing an example of the relationship between a first period and a second period.

FIG. 7 is a table for describing another example of the relationship between the first period and the second period.

DESCRIPTION OF EXEMPLARY EMBODIMENTS

Figure 1:
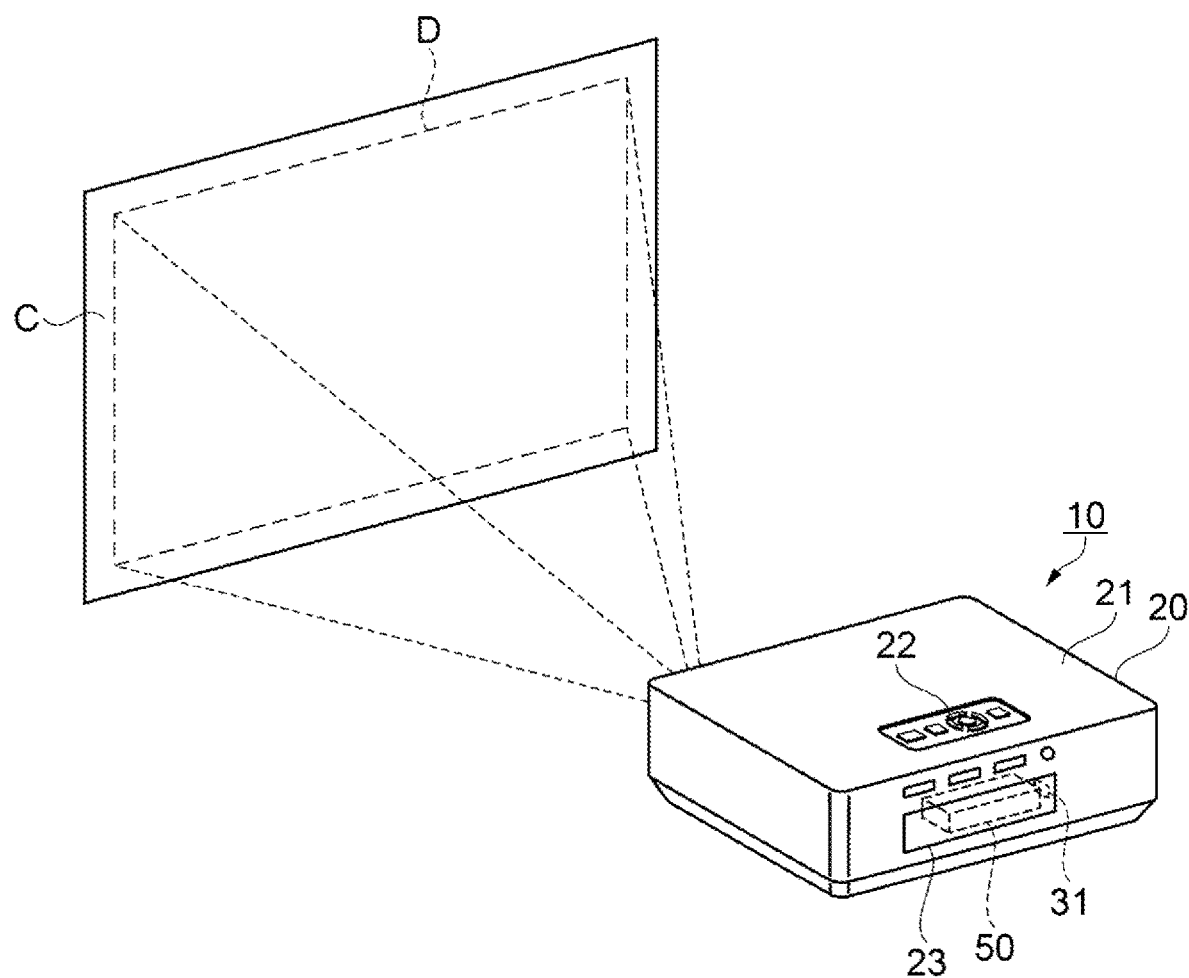
FIG. 1 is a perspective view for describing a display system according to an embodiment.

A display system 10 according to an embodiment includes an image supply apparatus 50, which supplies an image signal, and a display apparatus 20, which displays an image D based on the image signal supplied from the image supply apparatus 50, as shown in FIG. 1. The image supply apparatus 50 has a first automatic sleep function of achieving transition to a first sleep mode in accordance with a situation in which a no-operation state lasts for a first period t1. The image supply apparatus 50 can, for example, be a digital media player that outputs an image signal acquired by using content distribution service and a wireless display adaptor that outputs an image signal representing the screen of another apparatus.

The display apparatus 20 has a second automatic sleep function of achieving transition to a second sleep mode in accordance with a situation in which the image signal is not supplied continuously for a second period t2. The image supply apparatus 50 supplies the display apparatus 20 with the image signal, and the display apparatus 20 displays the image D based on the image signal. In the present embodiment, the display apparatus 20 will be described by way of example as a projector that projects light representing the image D on a screen C to display the image D on the screen C. A display instrument 40 may be a flat display, such as a liquid crystal display and an organic electro-luminescence display.

The display apparatus 20 includes an interface (I/F) 31, to which the image signal is supplied from the image supply apparatus 50. The I/F 31 receives first information representing the first period t1 from the image supply apparatus 50. The I/F 31 can include a communication circuit that establishes a communication link between the I/F 31 and the image supply apparatus 50 to transmit and receive communication data, such as the image signal and the first information, to and from the image supply apparatus 50. The communication link between the I/F 31 and the image supply apparatus 50 may be a wired or wireless communication link. When the communication link is a wired communication link, the I/F 31 may have at least one type of terminal selected, for example, from an HDMI (registered trademark) terminal, an HDBaseT (registered trademark) terminal, a USB (universal serial bus) terminal, and a DisplayPort terminal.

The display apparatus 20 includes an enclosure 21 and an input instrument 22. The enclosure 21 accommodates parts that form the display apparatus 20. The enclosure 21 includes, for example, an accommodation chamber 23, which accommodates at least part of the image supply apparatus 50. In the example shown in FIG. 1, the accommodation chamber 23 is closed with a lid with the entire image supply apparatus accommodated. The accommodation chamber 23 may be configured as a recess in which part of the image supply apparatus 50 is put. The image supply apparatus 50 may instead be located outside the enclosure 21.

The input instrument 22 accepts a user's operation and outputs a signal according to the user's operation. The input instrument 22 can, for example, be any of a variety of input apparatuses, such as a push button, a touch sensor, a keyboard, and a pointing device. The input instrument 22 may include a remote control using an electromagnetic wave, such as infrared light.

Figure 2:
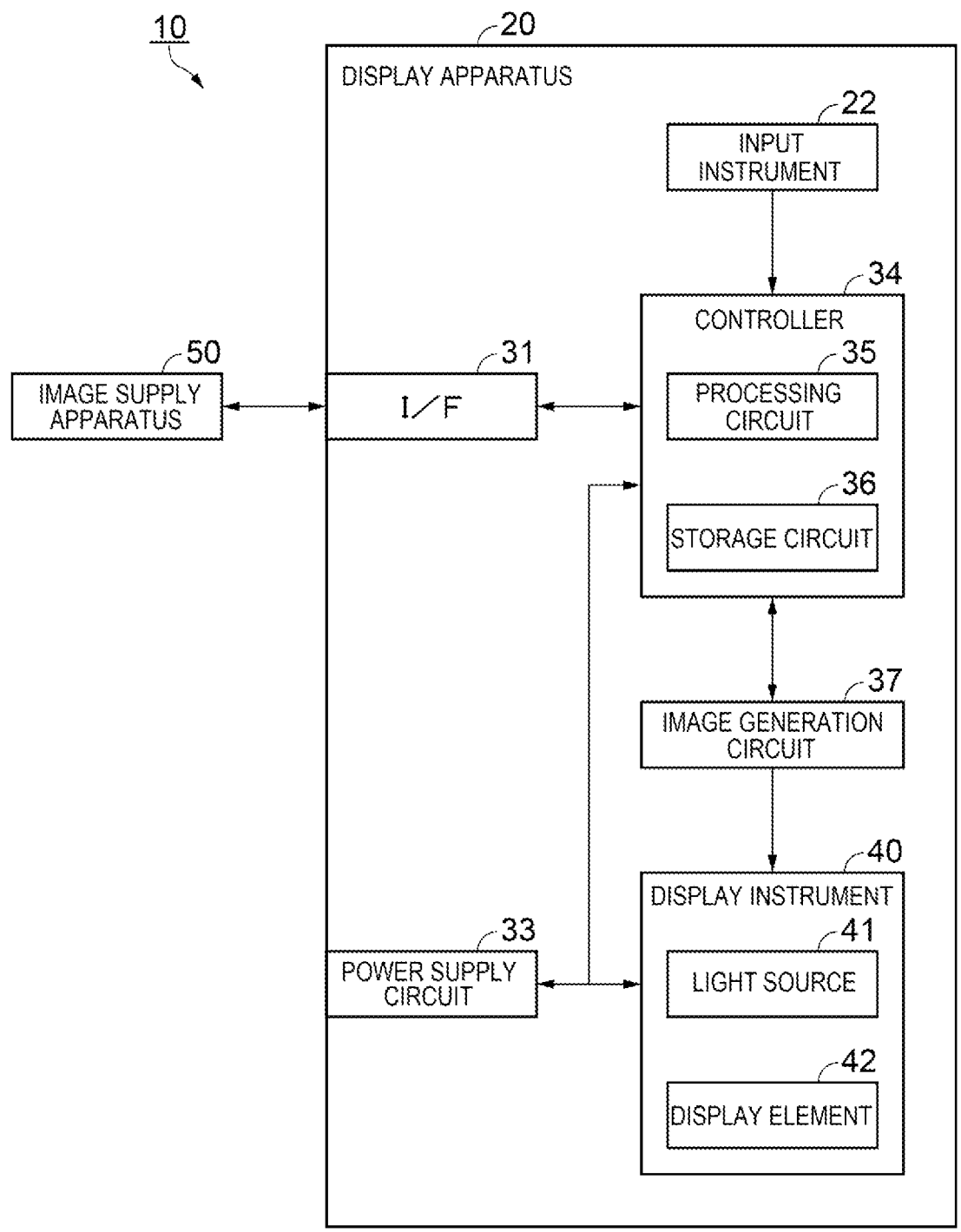
FIG. 2 is a block diagram for describing a basic configuration of a display apparatus according to the embodiment.

The display apparatus 20 further includes a power supply circuit 33, a controller 34, an image generation circuit 37, and the display instrument 40, which are each accommodated in the enclosure 21, as shown in FIG. 2. The power source circuit 33 has, for example, a power terminal to which power is supplied from a power system. The power source circuit 33 converts AC power supplied from the power terminal to DC power and supplies each portion of the display apparatus 20 with the DC power. The power source circuit 33 supplies the controller 34 and the display instrument 40 with operating power in a normal mode. The operating power is power necessary for the display apparatus 20 to display the image D performed. The power source circuit 33 supplies the controller 34 with standby power lower than the operating power in the second sleep mode. When the power is supplied to the power terminal of the power source circuit 33, the power source circuit 33 supplies the controller 34 with the standby power. The power source circuit 33 may supply the image supply apparatus 5 with power in the normal mode.

The controller 34 includes a processing circuit 35 and a storage circuit 36. The processing circuit 35 is a computer processing apparatus that processes computation necessary for the action of the display apparatus 20. The storage circuit 36 is a computer readable recording medium that stores, for example, a control program and a variety of data representing a series of processes necessary for the action of the display apparatus 20. The processing circuit 35 executes, for example, the control program stored in the storage circuit 36. The processing circuit 35 thus achieves the functions described in the embodiment and controls each portion of the display apparatus 20.

The processing circuit 35 can be at least one type of processing apparatus selected from a variety of logical operation circuits, such as a central processing unit (CPU), a digital signal processor (DSP), a programmable logic device (PLD), and an application specific integrated circuit (ASIC). The storage circuit 36 can, for example, be a semiconductor memory. The storage circuit 36 is not limited to a nonvolatile auxiliary storage apparatus and may include a volatile primary storage apparatus, such as a register and a cash memory built in a CPU. The processing circuit 35 and the storage circuit 36 may be formed of an integrated hardware component or two or more separate hardware components.

The image generation circuit 37 generates a drive signal representing the image D based on the image signal inputted via the I/F/31 and outputs the drive signal to the display instrument 40 under the control of the processing circuit 35. The image generation circuit 37 may generate the drive signal representing computer graphics generated by the control program executed by the controller 34. The image generation circuit 37 includes a rendering engine, a graphics memory, and other components. The hardware of the image generation circuit 37 may be configured as part of the hardware of the processing circuit 35.

The display instrument 40 is, for example, a projection instrument including a light source 41, a display element 42 having a plurality of pixels, and an optical system that is not shown but includes a lens, a mirror, and other optical components. The light source 41 includes a light emitter, such as a discharge lamp and a solid-state light source. The light emitted from the light source 41 is introduced to the display element 42 via the optical system. The display element 42 is a light modulator that modulates the light introduced thereto in accordance with the drive signal inputted from the image generation circuit 37, and an example of the display element 42 is a liquid crystal light valve. The display instrument 40 projects the light having traveled via the display element 42 on the screen C via the optical system to display the image D on the screen C. The display instrument 40 can be configured based on another scheme, such as a scheme using a mirror device that scans the screen C with modulated light and a scheme using a digital micro-mirror device that controls light reflection on a pixel basis.

The processing circuit 35 transitions to the second sleep mode in accordance with a state in which the image signal is not supplied continuously for the second period t2 in the normal mode, that is, a state in which no effective image signal is inputted continuously for the second period t2 in the normal mode. The processing circuit 35 may regard a period for which the image D based on the image signal does not change as the period for which the image signal is not supplied. In detail, the processing circuit 35 transitions to the second sleep mode in accordance with a state in which the image signal is not supplied continuously for the second period t2 with no operation performed on the input instrument 22. That is, the second period t2 is a limited period for which the processing circuit 35 waits before transitioning to the second sleep mode when the image supply apparatus 50 with the first automatic sleep function activated supplies the I/F 31 with the image signal. In practice, the processing circuit 35 causes the power supply circuit 33 to transition to the second sleep mode after the processing circuit 35 determines the power supply circuit 35 to transition to the second sleep mode and then causes the display element 42 to be refreshed and the storage circuit 36 to store a variety of current settings.

The storage circuit 36 stores second information representing the second period t2. The storage circuit 36 stores reference information representing a reference period set in advance with respect to the second period t2. Values settable as the reference period range, for example, from several minutes to several hours. The reference period may be arbitrarily changed in accordance with the user's operation performed on the input instrument 22. The reference period is a limited period for which the processing circuit 35 waits before transitioning to the second sleep mode, for example, when an apparatus having no automatic sleep function supplies the I/F 31 with an image signal. An apparatus having no automatic sleep function may be the image supply apparatus 50 with the second automatic sleep function inactivated.

The processing circuit 35 sets the second information stored in the storage circuit 36 in such a way that the second period t2 is shorter than the reference period in accordance with the first information received by the I/F 31 from the image supply apparatus 50. For example, when the first information representing that the first period t1 is 5 minutes is set in the image supply apparatus 50, and the reference information representing that the reference period is 30 minutes is stored in the storage circuit 36, the processing circuit 35 can set the second information in such a way that the second period t2 is 5 minutes in accordance with the first information. As described above, the processing circuit 35 sets the second information, for example, in such a way that the second period t2 is equal to the first period t1. The processing circuit 35 may set the second information in such a way that the second period t2 is a specified period shorter than the reference period.

Since the power supply circuit 33 does not supply the display instrument 40 with the operating power in the second sleep mode, the display instrument 40 does not display the image D on the screen C. The processing circuit 35 transitions to the normal mode when detecting a signal according to predetermined operation from the input instrument 22 in the second sleep mode. Since the power supply circuit 33 supplies the display instrument 40 with the operating power in the normal mode, the display instrument 40 displays the image D on the screen C. That is, the power consumed by the display apparatus 20 in the second sleep mode is lower than the power consumed in the normal mode.

Figure 3:
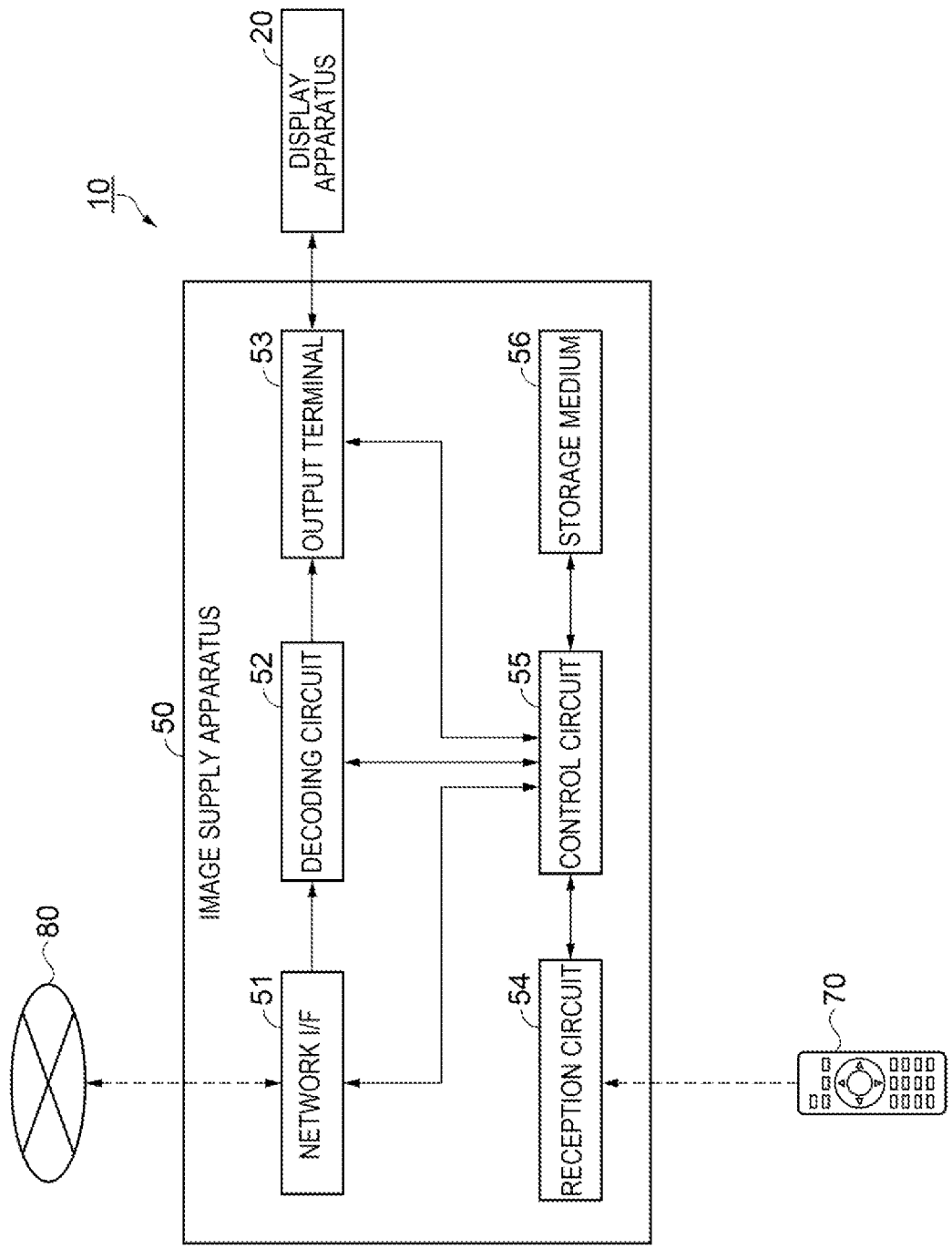
FIG. 3 is a block diagram for describing an example of an image supply apparatus according to the embodiment.

The image supply apparatus 50 includes, for example, a network I/F 51, a decoding circuit 52, an output terminal 53, a reception circuit 54, a control circuit 55, and a storage medium 56, as shown in FIG. 3. The network I/F 51 includes a circuit connected to a network 80, such as the Internet, via a communication link. The communication link may be a wired or wireless link. The network I/F 51, for example, receives streaming information representing a digital content from a server that is located on the network 80 and provides content distribution service and outputs the streaming information to the decoding circuit 52 under the control of the control circuit 55.

The decoding circuit 52 decodes the streaming information inputted from the network I/F 51 to convert the streaming information into an image signal in the format inputtable to the I/F 31 and outputs the image signal to the output terminal 53. That is, when the I/F 31 complies, for example, with the HDMI standard, the decoding circuit 52 generates an image signal compliant with the HDMI standard from the streaming information and outputs the image signal to the output terminal 53. The decoding circuit 52 and the control circuit 55 can be formed of the same hardware.

The output terminal 53 is a terminal coupled to the input terminal of the I/F 31. The output terminal 53 outputs the decoded image signal from the decoding circuit 52 as an image signal to the I/F 31. In the case where the I/F 31 complies with the HDMI standard, the output terminal 53 may relay a control signal based on a CEC (consumer electronics control) function between the display apparatus 20 and the control circuit 55.

The reception circuit 54 receives a control signal transmitted from a remote control 70, which accepts the user's operation, in accordance with the operation. The reception circuit 54 includes, for example, an antenna and a signal processing circuit that processes a signal received via the antenna. The reception circuit 54 receives, for example, a control signal sent in accordance with a wireless communication standard, such as Bluetooth (registered trademark). The reception circuit 54 decodes the control signal transmitted from the remote control 70 and outputs the control signal to the control circuit 55. When the control signal is relayed between the display apparatus 20 and the image supply apparatus 50, the remote control that is part of the input instrument 22 of the display apparatus 20 may function as the remote control 70 for the image supply apparatus 50.

The control circuit 55 forms a computer processing apparatus that carries out processes necessary for the action of the image supply apparatus 50. The control circuit 55 may include a variety of processing apparatuses, for example, a CPU. The storage medium 56 stores a program and a variety of data representing a series of processes necessary for the action of the image supply apparatus 50. The storage medium 56 includes, for example, a semiconductor memory. The control circuit 55 executes the program stored in the storage medium 56 to achieve the functions described in the embodiment and control each portion of the image supply apparatus 50. The image supply apparatus 50 outputs an image signal representing a digital content to the I/F 31 under the control of the control circuit 55. The image supply apparatus 50 may output an image signal representing computer graphics generated by the program executed by the control circuit 55 to the I/F 31.

The control circuit 55 transitions to the first sleep mode in accordance with a situation in which a state in which no operation is performed on the image supply apparatus 50, that is, the no-operation state lasts for the first period t1 in a predetermined standby state. The standby state is, for example, a state in which the display apparatus 20 does not display an image representing a digital content but the display apparatus 20 displays a standby screen that waits for the user's operation, such as a home screen, a menu screen, and a screen saver. The image supply apparatus 50 stops outputting the image signal via the output terminal 53 in the first sleep mode. That is, the power consumed by the image supply apparatus 50 in the first sleep mode is lower than the power consumed in the normal state before the transition to the first sleep mode.

The storage medium 56 stores the first information representing the first period t1. The first period t1 is a limited period for which the control circuit 55 waits before transitioning to the first sleep mode. Values settable as the first period t1 range, for example, from several minutes to several hours. The first period t1 may be arbitrarily changed in accordance with the user's operation performed on the remote control 70.

Figure 4:
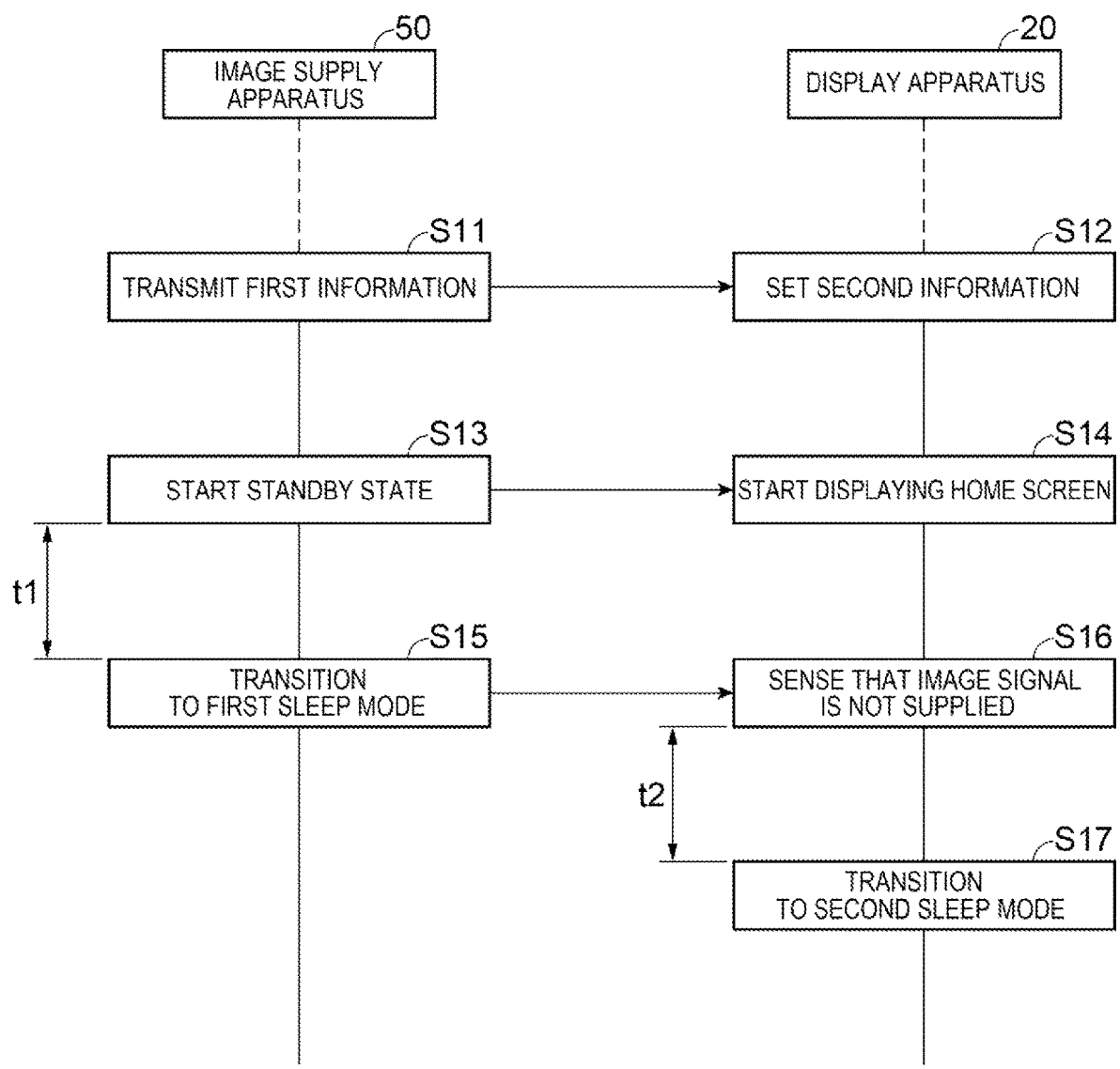
FIG. 4 is a sequence diagram for describing an example of the action of the display system according to the embodiment.

An example of the actions of the image supply apparatus 50 and the display apparatus 20 will be described as a method for controlling the display system 10 according to the embodiment with reference to the sequence diagram of FIG. 4. The series of processes shown in FIG. 4 start in accordance with establishment of the communication link between the image supply apparatus 50 and the display apparatus 20 resulting, for example, from operation of powering on the projector or operation of connecting a cable to the projector.

In step S11, the image supply apparatus 50 transmits the first information to the display apparatus 20 via the output terminal 53. The display apparatus 20 sets the second information in such a way that the second period t2 is shorter than the reference period in accordance with the first information received by the I/F 31 from the image supply apparatus 50.

In step S13, the image supply apparatus 50 starts the standby state, in which the standby screen is displayed. It is assumed in the description that the standby screen is a home screen by way of example. The image supply apparatus 50 inputs an image signal representing the home screen to the I/F 31. In step S14, the display apparatus 20 starts displaying the home screen as the image D based on the image signal.

In step S15, the image supply apparatus 50 transitions to the first sleep mode in accordance with the elapse of the first period t1 after the start of the standby state in step S13. Specifically, the control circuit 55 transitions to the first sleep mode in accordance with the situation in which the no-operation state lasts for the first period t1 in the standby state. The image supply apparatus 50 thus stops supplying the image signal to the signal apparatus 20.

In step S16, the display apparatus 20 senses that the image signal is not supplied. In step S17, the display apparatus 20 transitions to the second sleep mode in accordance with the situation in which the image signal is not supplied continuously for the second period t2 set in step S12. It is, however, noted that when operation is performed on the input instrument 22 after it is sensed that the image signal is not supplied but before the second period t2 elapses, the processing circuit 35 does not transition to the second sleep mode but resets time measurement over the second period t2. That is, the processing circuit 35 transitions to the second sleep mode when the image signal is not supplied and the state in which no operation is performed on the input instrument 22 lasts for the second period t2.

Figure 5:
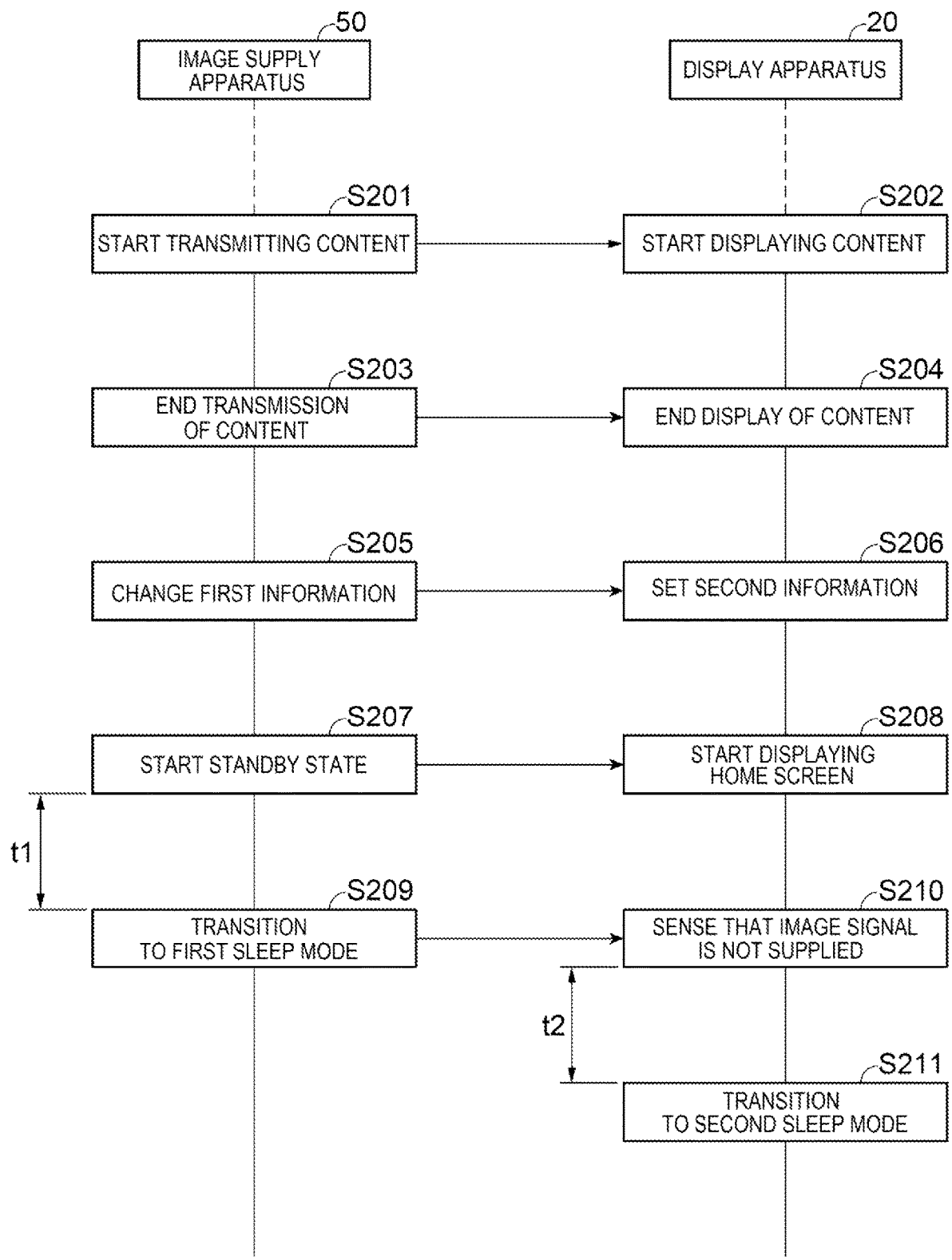
FIG. 5 is a sequence diagram for describing another example of the action of the display system according to the embodiment.

Another example of the actions of the image supply apparatus 50 and the display apparatus 20 will be described with reference to the sequence diagram of FIG. 5.

In step S201, the image supply apparatus 50 starts transmitting an image signal representing, for example, a digital content. In step S202, the display apparatus 20 starts displaying the image D based on the image signal. That is, the processing circuit 35 controls the image generation circuit 37 to cause it to generate a drive signal representing the image D from the image signal supplied to the I/F 31. The display instrument 40 thus displays the image D representing the digital content on the screen C.

In step S203, the image supply apparatus 50 ends the transmission of the image signal in accordance, for example, with the end of the digital content or the user's operation performed on the remote control 70. That is, the control circuit 55 causes the image signal not to be supplied via the output terminal 53 to the I/F 31. Accordingly, the display apparatus 20 ends the display of the image representing the digital content in step S204.

In step S205, the first information set in the image supply apparatus 50 is determined. For example, the control circuit 55 sets the first information representing the first period t1 in accordance with the user's operation performed on the remote control 70 and updates the first information stored in the storage medium 56. The control circuit 55 transmits the new first information to the display apparatus 20 via the output terminal 53 whenever the first period t1 is set, that is, whenever the first period t1 is changed. In step S206, the display apparatus 20 sets the second information in accordance with the first information received by the I/F 31 from the image supply apparatus 50 in such a way that the second period t2 is shorter than the reference period.

In step S207, the image supply apparatus 50 starts the standby state, in which the standby screen is displayed. The image supply apparatus 50 supplies the I/F 31, for example, with the image signal representing the home screen. In step S208, the display apparatus 20 starts displaying the home screen as the image D based on the image signal.

In step S209, the image supply apparatus 50 transitions to the sleep mode in accordance with the situation in which the first period t1 set in step S205 elapses after the start of the standby state in step S207. Specifically, the image supply apparatus 50 transitions to the first sleep mode in accordance with the situation in which the no-operation state lasts for the first period t1 in the standby state. The image supply apparatus 50 thus stops supplying the image signal.

In step S210, the display apparatus 20 senses that the image signal is not supplied. In step S211, the display apparatus 20 transitions to the second sleep mode in accordance with the situation in which the image signal is not supplied continuously for the second period t2 in the no-operation state. When operation is performed on the input instrument 22 after it is sensed that the image signal is not supplied but before the second period t2 elapses, the display apparatus 20 does not transition to the second sleep mode but resets the time measurement over the second period t2.

As described above, the display apparatus 20 can set the second information in accordance with the first information transmitted from the image supply apparatus 50 whenever the first period t1 is changed. The display apparatus 20 can set the second information, for example, in such a way that the second period t2 positively correlates with the first period t1. The display apparatus 20 can thus shorten the second period t2 in accordance with the first period t1 set in the image supply apparatus 50. For example, when the reference period set with respect to the second period t2 is 20 minutes, and the first period t1 is shorter than 20 minutes, the processing circuit 35 can set the second information in such a way that the second period t2 is equal to the first period t1, as shown in FIG. 6.

Instead, the display apparatus 20 may set the second information in such a way that the second period t2 negatively correlates with the first period t1. Setting the second period t2 complementarily with respect to the first period t1 allows a state in which the longer the period of the no-operation state of the image supply apparatus 50, the shorter the period in which the display apparatus 20 transitions to the second sleep mode. For example, when the reference period set with respect to the second period t2 is 20 minutes, and the first period t1 is shorter than 20 minutes, the processing circuit 35 can set the second information in such a way that the sum of the second period t2 and the first period t1 does not exceed 20 minutes, as shown in FIG. 7. The example shown in FIG. 7 shows a case where the second period t2 is zero, but a variety of margin periods are in practice considered as the second period t2, as described above.

As described above, the image supply apparatus 50 has the first automatic sleep function of achieving transition to the first sleep mode when the no-operation state lasts for the first period t1. The display apparatus 20 transitions to the second sleep mode when the image signal supplied from the image supply apparatus 50 is not supplied continuously for the second period t2. Upon reception of the first information representing the first period t1 from the image supply apparatus 50, the display apparatus 20 sets the second information in such a way that the second period t2 is shorter than the reference period. As described above, the display apparatus 20, when used along with the image supply apparatus 50 having the first automatic sleep function, can suppress an increase in power consumption by selectively shortening the period before the transition to the second sleep mode.

The display apparatus 20 may supply the image supply apparatus 50 with power. When the power supply circuit 33 supplies the image supply apparatus 50 with power, the power supply circuit 33 stops supplying the image supply apparatus 50 with power in the second sleep mode. An increase in power consumed by the display apparatus 20 can thus be efficiently suppressed.

The embodiment has been described above, but the present disclosure is not limited to the disclosed embodiment. The configuration of each portion may be replaced with an arbitrary configuration having the same function, and an arbitrary configuration in the embodiment may be omitted or added within the technical scope of the present disclosure. The disclosure of such replacement, omission and addition thus allows a person skilled in the art to conceive of a variety of alternate embodiments.

For example, the image supply apparatus 50 may transmit the first information in accordance with a request from the display apparatus 20. The display apparatus 20 transmits a request signal that requests the first information to the image supply apparatus 50 in accordance, for example, with establishment of the communication link with the image supply apparatus 50. The image supply apparatus 50 transmits the first information as a response to the request signal to the display apparatus 20. The first information may be transmitted at a timing specified in advance. The image supply apparatus 50 may transmit sleep notification representing transition to the first sleep mode to the display apparatus 20 immediately before the transition to the first sleep mode. The processing circuit 35 may set the second period t2 at zero in accordance with the sleep notification and transition to the second sleep mode.

In addition to the above, the present disclosure, of course, encompasses a variety of embodiments that are not described in the above sections, such as a configuration to which the configurations described above are mutually applied. The technical scope of the present disclosure is specified only by the inventive specific items according to the appended claims that are reasonably derived from the above description.

What is claimed is:

1. A method for controlling a display apparatus that displays an image based on an image signal supplied from an image supply apparatus that transitions to a first sleep mode in accordance with a situation in which a no-operation state lasts for a first period, the method comprising:
    storing second information representing a second period;
    causing the display apparatus to transition to a second sleep mode in accordance with a situation in which the image signal is not supplied continuously for the second period;
    receiving first information representing the first period from the image supply apparatus; and
    setting the second information in such a way that the second period is shorter than a reference period in accordance with the first information.

2. The method for controlling a display apparatus according to claim 1, wherein the second information is so set that the second period is equal to the first period.

3. A display apparatus that displays an image based on an image signal supplied from an image supply apparatus that transitions to a first sleep mode in accordance with a situation in which a no-operation state lasts for a first period, the apparatus comprising:
    a storage circuit that stores second information representing a second period;
    an interface that receives first information representing the first period from the image supply apparatus; and
    a processing circuit that transitions to a second sleep mode in accordance with a situation in which the image signal is not supplied continuously for the second period and sets the second information in such a way that the second period is shorter than a reference period in accordance with the first information.

4. A method for controlling a display system including an image supply apparatus that supplies an image signal and a display apparatus that displays an image based on the image signal, the method comprising:
    causing the image supply apparatus to transition to a first sleep mode in accordance with a situation in which a no-operation state lasts for a first period;
    causing the display apparatus to store second information representing a second period;
    causing the display apparatus to transition to a second sleep mode in accordance with a situation in which the image signal is not supplied continuously for the second period;
    causing the image supply apparatus to transmit first information representing the first period to the display apparatus; and
    causing the display apparatus to set the second information in such a way that the second period is shorter than a reference period in accordance with the first information.

5. The method for controlling a display system according to claim 4, wherein the image supply apparatus transmits the first information to the display apparatus whenever the first period is changed.

6. The method for controlling a display system according to claim 5, wherein the second information is so set that the second period positively correlates with the first period.

7. The method for controlling a display system according to claim 5, wherein the second information is so set that the second period negatively correlates with the first period.

* * * * *